(12) United States Patent
Lu et al.

(10) Patent No.: US 11,462,980 B2
(45) Date of Patent: Oct. 4, 2022

(54) DUCTED DOUBLE-MAGNETIC-CIRCUIT CORELESS MOTOR SPECIAL FOR ELECTRIC AIRCRAFT

(71) Applicant: Jirong Lu, Beijing (CN)

(72) Inventors: Jirong Lu, Beijing (CN); Yao Lu, Beijing (CN)

(73) Assignee: Jirong Lu, Beijing (CN)

( * ) Notice: Subject to any disclaimer, the term of this patent is extended or adjusted under 35 U.S.C. 154(b) by 219 days.

(21) Appl. No.: 17/030,290

(22) Filed: Sep. 23, 2020

(65) Prior Publication Data

US 2021/0376703 A1 Dec. 2, 2021

(30) Foreign Application Priority Data

May 26, 2020 (CN) .......................... 202020926735.8

(51) Int. Cl.
| | |
|---|---|
| *H02K 16/02* | (2006.01) |
| *H02K 3/47* | (2006.01) |
| *H02K 7/08* | (2006.01) |
| *B64D 27/24* | (2006.01) |
| *H02K 5/173* | (2006.01) |

(52) U.S. Cl.
CPC ............ *H02K 16/02* (2013.01); *B64D 27/24* (2013.01); *H02K 3/47* (2013.01); *H02K 5/1732* (2013.01); *H02K 7/083* (2013.01); *H02K 2203/06* (2013.01)

(58) Field of Classification Search
CPC ........ H02K 16/02; H02K 3/47; H02K 5/1732; H02K 7/083; H02K 2203/06; B64D 27/24
See application file for complete search history.

(56) References Cited

U.S. PATENT DOCUMENTS

| | | | | |
|---|---|---|---|---|
| 2006/0038461 | A1* | 2/2006 | Gabrys | H02K 21/24 310/268 |
| 2010/0194231 | A1* | 8/2010 | Rippel | H02K 3/30 310/213 |
| 2010/0226802 | A1* | 9/2010 | Kawamura | H02K 16/02 310/114 |
| 2017/0159663 | A1* | 6/2017 | Jang | F04D 29/326 |
| 2020/0141381 | A1* | 5/2020 | Lu | F03D 9/32 |

FOREIGN PATENT DOCUMENTS

| | | |
|---|---|---|
| CN | 101272081 A | 9/2008 |
| CN | 211151780 U | 7/2020 |

* cited by examiner

*Primary Examiner* — Tulsidas C Patel
*Assistant Examiner* — Viswanathan Subramanian

(57) ABSTRACT

The present invention discloses a ducted double-magnetic-circuit coreless motor special for electric aircraft, which is an open special motor with a hollow structure according to the technical invention and includes a housing, a main shaft, a coreless stator winding, an inner rotor structure and an outer rotor structure. The main shaft is arranged in the middle of the housing; the inner rotor structure is connected with the main shaft; the outer rotor structure is connected with the inner rotor structure; and the coreless stator winding is arranged between the inner rotor structure and the outer rotor structure. The coreless stator winding can generate an electromagnetic torque when current is applied; and the inner rotor structure and the outer rotor structure can fully induce the electromagnetic torque of the coreless stator winding and rotate about the main shaft simultaneously, thereby directly driving the electric aircraft to fly.

4 Claims, 5 Drawing Sheets

DUCTED DOUBLE-MAGNETIC-CIRCUIT CORELESS MOTOR SPECIAL FOR ELECTRIC AIRCRAFT

CROSS-REFERENCE TO RELATED APPLICATION

This application claims the benefit of priority from Chinese Patent Application No. 202020926735.8, filed on May 26, 2020. The content of the aforementioned application, including any intervening amendments thereto, is incorporated herein by reference in its entirety.

TECHNICAL FIELD

The present invention relates to the field of motors, in particular to a ducted double-magnetic-circuit coreless motor special for electric aircraft.

BACKGROUND OF THE PRESENT INVENTION

In the existing motor technology, the conventional permanent magnet motor is mainly composed of two major structures: a stator core winding and a permanent magnet rotor. The stator windings are arranged in a cog slot of a silicon steel sheet core in turn; a cog slot resistance moment of a permanent magnet rotor magnetic field for attracting to the silicon steel sheet core will be naturally generated in air gaps between the stator windings and the permanent magnet rotors; and when the current is inputted into the stator windings, the attracted stator cog slot structure will have hysteresis resistance and eddy current resistance phenomena and have heat energy consumption of iron loss. Therefore, the coreless motor with higher energy conversion efficiency will become the development direction of the motor industry. However, because the coreless stator winding has no magnetic permeability of the silicon steel sheet core, the magnetic force lines that induce electromagnetic torque relative to the permanent magnet rotors will be weakened.

SUMMARY OF THE PRESENT INVENTION

According to the working principle of coreless permanent magnet motors, only one electromagnetic torque can be generated in an air gap between a coreless stator winding and a permanent magnet inner rotor; and the permanent magnet inner rotor structure can only induce the electromagnetic torque on a contact surface inside the coreless stator winding, while the electromagnetic torque outside the coreless stator winding cannot be induced by the permanent magnet inner rotor structure. Therefore, the main purpose of the present invention is to provide a technical solution of electromagnetic induction with double magnetic circuits. One permanent magnet outer rotor structure is added to the outer side of the coreless stator winding and is connected with the permanent magnet inner rotor structure in parallel in magnetic circuit design to form an electromagnetic induction magnetic circuit with double magnetic circuits, so that the permanent magnet inner rotor structure and the permanent magnet outer rotor structure can simultaneously induce magnetic force lines of the electromagnetic torque of the coreless stator winding.

To achieve the above purpose, the present invention provides a ducted double-magnetic-circuit coreless motor special for electric aircraft, including a housing, a main shaft, a coreless stator winding, an inner rotor structure and an outer rotor structure.

The housing is a hollow structure.

The main shaft is arranged in the housing.

The coreless stator winding is arranged between the inner rotor structure and the outer rotor structure, and can generate an electromagnetic torque when current is applied, so that the inner rotor structure and the outer rotor structure can induce the electromagnetic torque of the coreless stator winding simultaneously, thereby generating a driving force for rotating the inner rotor structure and the outer rotor structure about the main shaft synchronously.

The inner rotor structure is connected with the main shaft and has an independent inner rotor electromagnetic induction magnetic circuit, which can induce the electromagnetic torque of the coreless stator winding and can rotate about the main shaft and the outer rotor structure simultaneously to output the driving force for driving the electric aircraft to fly.

The outer rotor structure is connected with the inner rotor structure and has an independent inner rotor electromagnetic induction magnetic circuit, which can induce the electromagnetic torque of the coreless stator winding and can rotate about the main shaft and the inner rotor structure simultaneously to output the driving force for driving the electric aircraft to fly.

Preferably, the housing includes a main body, a first fixing piece, a second fixing piece, a first bearing sleeve, a second bearing sleeve, a first bearing and a second bearing, wherein the first bearing is sleeved at one end of the main shaft; the second bearing is sleeved at the other end of the main shaft; the first bearing sleeve is sleeved on the first bearing; the second bearing sleeve is sleeved on the second bearing; the first fixing piece is used for connecting the first bearing sleeve with one end of the main body; and the second fixing piece is used for connecting the second bearing sleeve with the other end of the main body.

Preferably, the coreless stator winding includes coil assemblies, a lead-out wire and an annular connecting backplane, wherein a reserved lead-out hole is formed in the annular connecting backplane; one end of the lead-out wire is connected with each coil assembly; the other end of the lead-out wire passes through the reserved lead-out hole of the annular connecting backplane and is connected with an external power supply; the coreless stator winding is arranged on the annular connecting backplane; the coil assemblies can generate the electromagnetic torque when current is applied; and the annular connecting backplane is connected with the second fixing piece.

Preferably, the inner rotor structure includes permanent magnets of inner rotor, an annular load bearing piece of inner rotor, a propeller of inner rotor and a fixed casing, wherein the permanent magnets of inner rotor are arranged on the annular load bearing piece of inner rotor; the propeller of inner rotor is connected with the annular load bearing piece of inner rotor; one end of the propeller of inner rotor facing away from the annular load bearing piece of inner rotor is connected with the fixed casing; the fixed casing is sleeved on the main shaft; and the propeller of inner rotor can rotate about the main shaft to directly generate the driving force for driving the electric aircraft.

Preferably, the outer rotor structure includes permanent magnets of outer rotor, an annular load bearing piece of outer rotor, a propeller of outer rotor and an annular connecting piece, wherein the permanent magnets of outer rotor are arranged on the annular load bearing piece of outer rotor; the propeller of outer rotor is connected with the annular load bearing piece of outer rotor; the annular load bearing piece of outer rotor is connected with one end of the annular connecting piece; the annular load bearing piece of inner rotor is connected with the other end of the annular connecting piece; and the propeller of outer rotor can rotate about the main shaft to directly generate the driving force for driving the electric aircraft.

Preferably, the ducted double-magnetic-circuit coreless motor special for electric aircraft further includes a hemispherical air deflector and a semi-olivary air deflector, wherein the hemispherical air deflector is arranged on the annular connecting piece; and the semi-olivary air deflector is arranged on the first bearing sleeve.

The technical solution of the present invention has the following advantages: an electromagnetic torque will be generated between the inner rotor structure and the outer rotor structure after the external power supply is inputted to the coreless stator winding; and the coreless stator winding can make full use of the electromagnetic torque in the air gaps in the inner side and the outer side, simultaneously drive the propellers on the inner rotor structure and the outer rotor structure to rotate synchronously, and discharge the air in front of the housing to the rear of the housing to form jet airflow to drive the electric aircraft to fly forward. The coreless stator winding does not have the core structure of the silicon steel sheet, so as to prevent the hysteresis resistance and eddy current resistance phenomena and also avoid the heat energy consumption of iron loss.

BRIEF DESCRIPTION OF THE DRAWINGS

To more clearly describe the technical solutions in the embodiments of the present invention or in the prior art, the drawings required to be used in the embodiments will be simply presented below. Apparently, the drawings in the following description are merely some embodiments of the present invention, and for those ordinary skilled in the art, other drawings can also be obtained according to the structures shown by the drawings without contributing creative labor.

In the figures, 100. ducted double-magnetic-circuit coreless motor special for electric aircraft; 200. electric aircraft; 1. housing; 11. main body; 12. first fixing piece; 13. second fixing piece; 14. first bearing sleeve; 15. second bearing sleeve; 16. first bearing; 17. second bearing; 2. main shaft; 3. coreless stator winding; 31. coil assembly; 32. lead-out wire; 33. annular connecting backplane; 331. reserved lead-out hole; 4. inner rotor structure; 41. permanent magnet of inner rotor; 42. annular load bearing piece of inner rotor; 43. propeller of inner rotor; 44. fixed casing; 5. outer rotor structure; 51. permanent magnet of outer rotor; 52. annular load bearing piece of outer rotor; 53. propeller of outer rotor; 54. annular connecting piece; 61. spherical air deflector; 62. olivary air deflector; and 7. mounting frame.

DETAILED DESCRIPTION OF THE PRESENT INVENTION

Technical solutions in the embodiments of the present invention are described clearly and fully below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

A specific structure of a ducted double-magnetic-circuit coreless motor special for electric aircraft will be described below.

Figure 1:
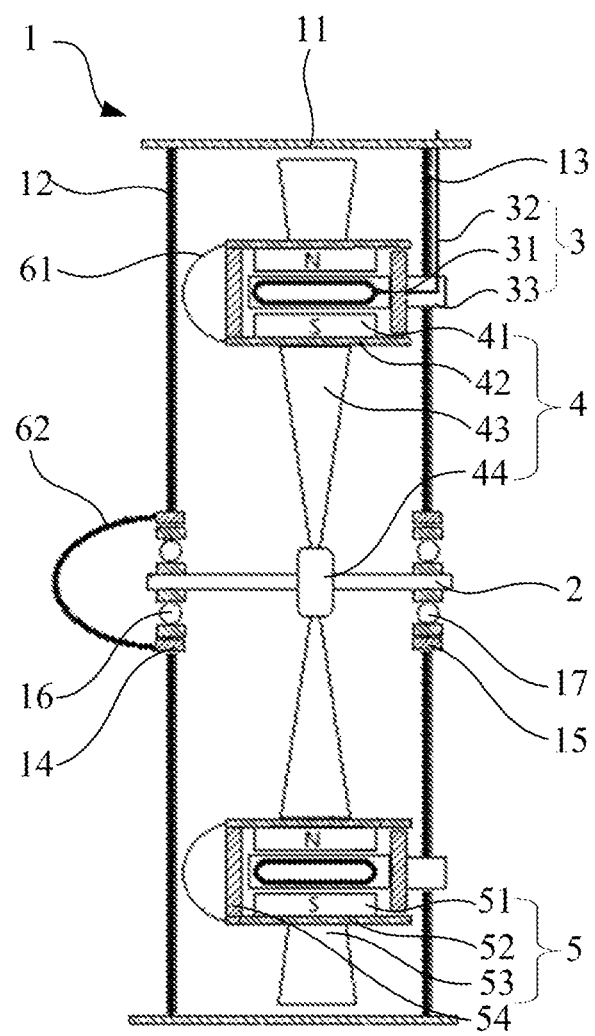
FIG. 1 is a structural schematic diagram of a side profile of a ducted double-magnetic-circuit coreless motor special for electric aircraft according to an embodiment.

As shown in FIG. 1, the ducted double-magnetic-circuit coreless motor special for electric aircraft includes a housing 1, a main shaft 2, a coreless stator winding 3, an inner rotor structure 4 and an outer rotor structure 5. The housing 1 is used for a load bearing piece mounted on an electric aircraft 200; the housing 1 is a hollow structure; the main shaft 2 is arranged in the housing 1; the coreless stator winding 3 is arranged in the housing 1; and the coreless stator winding 3 can generate an electromagnetic torque when current is applied. The inner rotor structure 4 is arranged inside the coreless stator winding 3 and is connected with the main shaft 2. The inner rotor structure 4 has an independent electromagnetic induction magnetic circuit, which can induce the electromagnetic torque of the coreless stator winding 3 and rotate about the main shaft 2 to directly generate a driving force for driving the electric aircraft 200 to fly. The outer rotor structure 5 is arranged outside the coreless stator winding 3 and is connected with the inner rotor structure 4. The outer rotor structure 5 has an independent electromagnetic induction magnetic circuit, which can induce the magnetic torque of the coreless stator winding 3. With the rotation of the inner rotor structure 4 about the main shaft 2, the driving force for driving the electric aircraft 200 to fly is directly generated. Specifically, the housing 1 is a main structure for bearing the main shaft 2, the coreless stator winding 3, the inner rotor structure 4 and the outer rotor structure 5, and is also the main structure for mounting on the electric aircraft 200. The main shaft 2 is arranged in the housing 1 to play a role of central positioning, and enables the ducted double-magnetic-circuit coreless motor special for electric aircraft to have a permeable open hollow design structure, so that the coreless stator winding 3 has better heat dissipation property. Since air can circulate in the housing 1, the inner rotor structure 4 and the outer rotor structure 5 can directly drive the electric aircraft 200 to fly. The main shaft 2 has no function of outputting the driving force.

Figure 4:
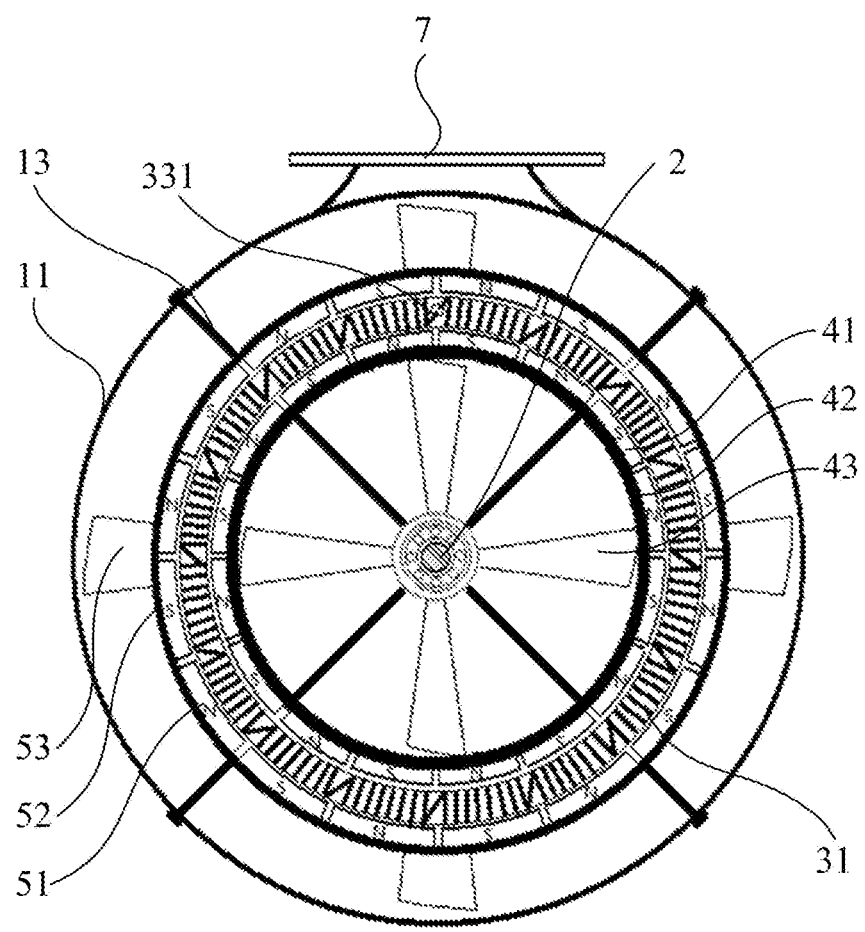
FIG. 4 is a structural schematic diagram of a double-magnetic-circuit coreless motor special for electric aircraft according to an embodiment.
Figure 5:
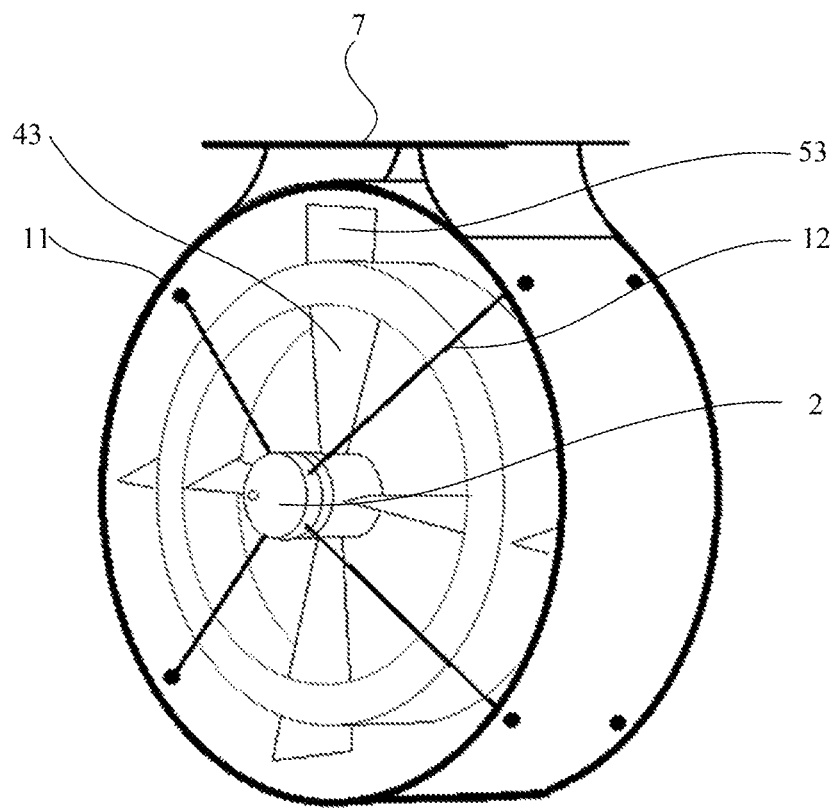
FIG. 5 is a schematic diagram of a mounting structure of a ducted double-magnetic-circuit coreless motor special for electric aircraft according to an embodiment.

As shown in FIGS. 1 and 4, the housing 1 includes a main body 11, a first fixing piece 12, a second fixing piece 13, a first bearing sleeve 14, a second bearing sleeve 15, a first bearing 16 and a second bearing 17. The first bearing 16 is sleeved at one end of the main shaft 2; the second bearing 17 is sleeved at the other end of the main shaft 2; the first bearing sleeve 14 is sleeved on the first bearing 16; the second bearing sleeve 15 is sleeved on the second bearing 17; the first fixing piece 12 is used for connecting the first bearing sleeve 14 with one end of the main body 11; and the second fixing piece 13 is used for connecting the second bearing sleeve 15 with the other end of the main body 11. In the present embodiment, four first fixing pieces 12 are provided and connect the first bearing sleeve 14 with the main body 11 in a cross shape; and four second fixing pieces 13 are provided and connect the second bearing sleeve 15 with the main body 11 in a cross shape. It can be understood that the number of the first fixing pieces 12 and the second fixing pieces 13 may be less than three or greater than five; and the first fixing pieces 12 and the second fixing pieces 13 may be, but not limited to, cylindrical.

Figure 2:
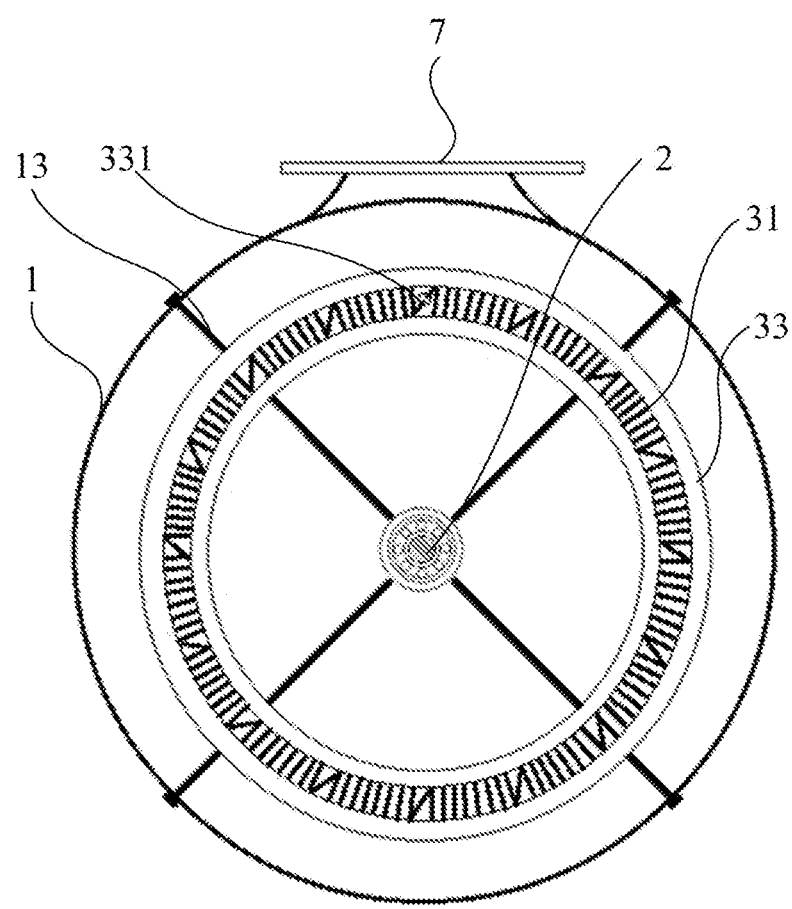
FIG. 2 is a schematic diagram of a mounting structure of a coreless stator winding of a ducted double-magnetic-circuit coreless motor special for electric aircraft according to an embodiment.
Figure 3:
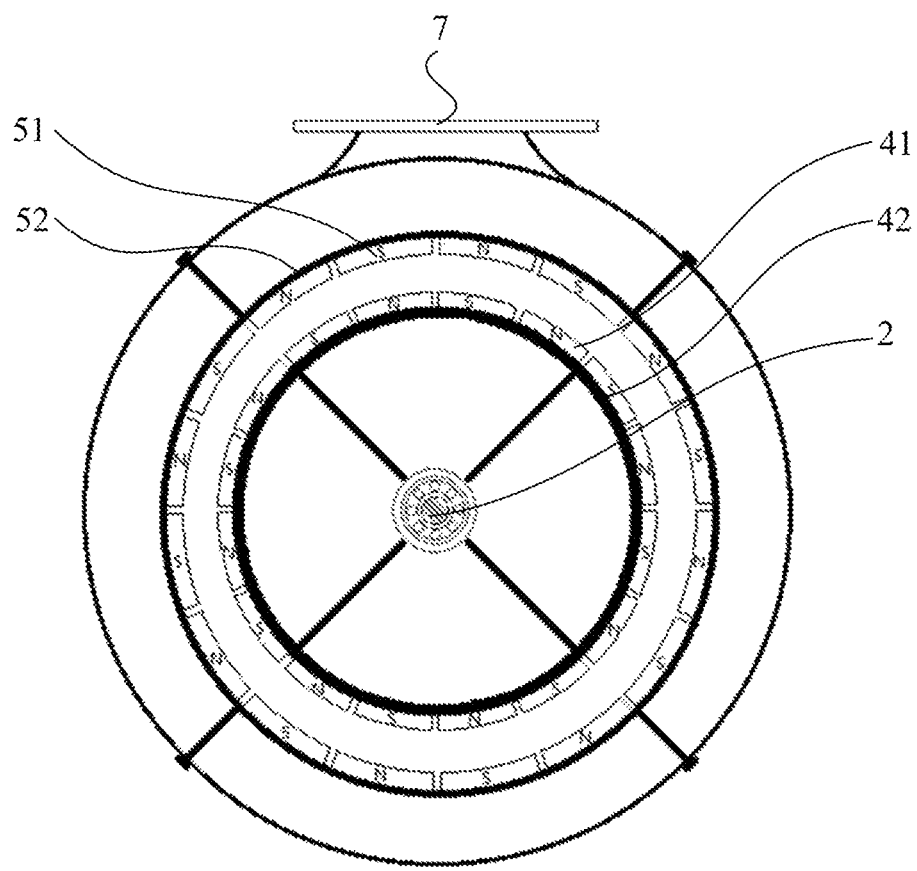
FIG. 3 is a schematic diagram of a mounting structure of an inner rotor structure and an outer rotor structure of a ducted double-magnetic-circuit coreless motor special for electric aircraft according to an embodiment.

As shown in FIGS. 1-2, the coreless stator winding 3 includes coil assemblies 31, a lead-out wire 32 and an annular connecting backplane 33; a reserved lead-out hole 331 is formed in the annular connecting backplane 33; one end of the lead-out wire 32 is connected with each coil assembly 31, while the other end of the lead-out wire 32 passes through the reserved lead-out hole 331 of the annular connecting backplane 33 and is connected with an external power supply; the coil assemblies 31 are arranged on the annular connecting backplane 33; and the annular connecting backplane 33 is connected with the second fixing piece 62.

As shown in FIG. 2, for the coil assemblies 31, a plurality of coil assemblies 31 are poured into an annular coreless stator winding structure 3 by using an encapsulation technology of polymer insulation materials, so as to realize the fixed connection between the coil assemblies 31 and the annular connecting backplane 33; and the coil assemblies 31 casted with polymer insulation resin materials can also play a waterproof role.

As shown in FIGS. 1 and 4, the inner rotor structure 4 includes permanent magnets 41 of inner rotor, an annular load bearing piece 42 of inner rotor, a propeller 43 of inner rotor and a fixed casing 44; a plurality of permanent magnets 41 of inner rotor are arranged on an outer wall of the annular load bearing piece 42 of inner rotor according to an arrangement sequence of N pole and S pole so as to form an electromagnetic induction magnetic circuit of the inner rotor structure 4. The propeller 43 of inner rotor is connected with an inner wall of the annular load bearing piece 42 of inner rotor; one end of the propeller 43 of inner rotor facing away from the annular load bearing piece 42 of inner rotor is connected with the fixed casing 44; and the fixed casing 44 is sleeved on the main shaft 2. In the present embodiment, four propellers 43 of inner rotor are provided; but it can be understood that the number of the propellers 43 of inner rotor may be less than three or greater than five; and propeller tips of the propellers 43 of inner rotor can also be sharp or round. The four propellers 43 of inner rotor can rotate about the main shaft 2 to directly generate the driving force for driving the electric aircraft 200.

As shown in FIGS. 1 and 4, the outer rotor structure 5 includes permanents 51 magnets of outer rotor, an annular load bearing piece 52 of outer rotor, a propeller 53 of outer rotor and an annular connecting piece 44; a plurality of permanent magnets 51 of outer rotor are arranged on the inner wall of the annular load bearing piece 52 of outer rotor according to the arrangement sequence of N pole and S pole to form an electromagnetic induction magnetic circuit of the outer rotor structure 5; the propeller 53 of outer rotor is connected with the outer wall of the annular load bearing piece 52 of outer rotor; the annular load bearing piece 52 of outer rotor is connected with one end of the annular connecting piece 54; and the annular load bearing piece 42 of inner rotor is connected with the other end of the annular connecting piece 54. In the present embodiment, four propellers 53 of outer rotor are provided; but it can be understood that the number of the propellers 53 of outer rotor can also be greater than five; and four propellers 53 of outer rotor can rotate about the main shaft 2 to increase the driving force of the electric aircraft 200.

As shown in FIG. 1, the ducted double-magnetic-circuit coreless motor special for electric aircraft further includes a hemispherical air deflector 61 and a semi-olivary air deflector 62; the hemispherical air deflector 61 is arranged on the annular connecting piece 54 to reduce the influence of air resistance; the semi-olivary air deflector 62 is arranged on the first bearing sleeve 14 to reduce the influence of air resistance. It can be understood that both the hemispherical air deflector 61 and the semi-olivary air deflector 62 can also be designed to be conical to reduce the influence of air resistance.

Figure 6:
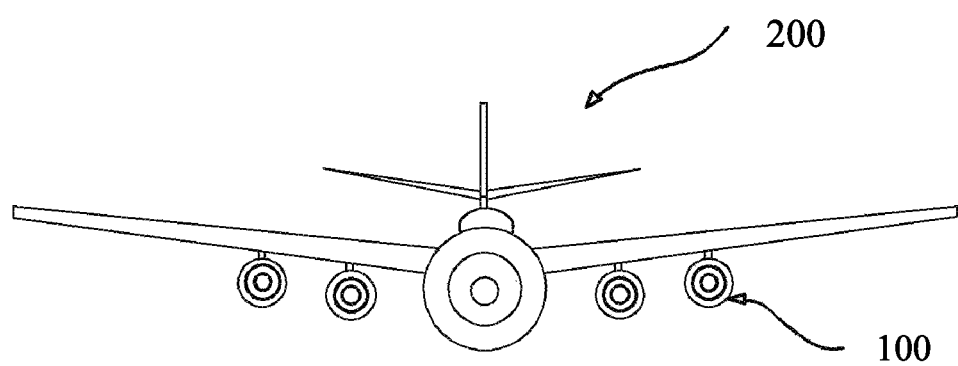
FIG. 6 is a schematic diagram of a simulated mounting structure of a ducted double-magnetic-circuit coreless motor special for electric aircraft according to an embodiment.

As shown in FIGS. 1, 2 and 6, the ducted double-magnetic-circuit coreless motor special for electric aircraft further includes a mounting frame 7; the mounting frame 7 is arranged on the housing 1 and is used for mounting the housing 1 on the electric aircraft 200.

With reference to FIGS. 1 and 6, the cooperation and action processes of various mechanisms are as follows:

The ducted double-magnetic-circuit coreless motor 100 special for electric aircraft is mounted on the electric aircraft 200 through the mounting frame 7; the lead-out wire 32 is connected with the external power supply; the current is inputted into the coil assemblies 31, so that the coil assemblies 31 generate an electromagnetic torque; the inner rotor structure 4 and the outer rotor structure 5 induce the electromagnetic torque in the air gaps inside and outside the coreless stator windings 3 simultaneously, drive the propeller 43 of inner rotor and the propeller 53 of outer rotor to rotate synchronously, and discharge the air in front of the housing 1 to the rear of the housing 1 to form jet airflow for driving the electric aircraft 200 to fly forward.

The above only describes preferred embodiments of the present invention, and is not intended to limit the patent scope of the present invention. Any equivalent structural transformation made by using the contents of the description and the accompanying drawings of the present invention under the utility model concept of the present invention or direct/indirect application in other relevant technical fields should fall within the patent protection scope of the present invention.

What is claimed is:

1. A ducted double-magnetic-circuit coreless motor special for electric aircraft, comprising a housing, a main shaft, a coreless stator winding, an inner rotor structure and an outer rotor structure, wherein
  the housing is a hollow structure;
  the main shaft is arranged in the housing;
  the coreless stator winding is arranged between the inner rotor structure and the outer rotor structure, and can generate an electromagnetic torque when current is applied, so that the inner rotor structure and the outer rotor structure can induce the electromagnetic torque of the coreless stator winding simultaneously, thereby generating a driving force for rotating the inner rotor structure and the outer rotor structure about the main shaft synchronously;
  the inner rotor structure is connected with the main shaft and has an independent inner rotor electromagnetic induction magnetic circuit which can induce the electromagnetic torque generated by the coreless stator winding and can output the driving force for driving an electric aircraft to fly;

the outer rotor structure is connected with the inner rotor structure and has an independent outer rotor electromagnetic induction magnetic circuit which can induce the electromagnetic torque generated by the coreless stator winding along with the inner rotor structure simultaneously to output the driving force for driving the electric aircraft to fly;

the housing comprises a main body, a first fixing piece, a second fixing piece, a first bearing sleeve, a second bearing sleeve, a first bearing and a second bearing; the first bearing is sleeved at one end of the main shaft; the second bearing is sleeved at the other end of the main shaft; the first bearing sleeve is sleeved on the first bearing; the second bearing sleeve is sleeved on the second bearing; the first fixing piece is used for connecting the first bearing sleeve with one end of the main body; and the second fixing piece is used for connecting the second bearing sleeve with the other end of the main body; and the coreless stator winding comprises coil assemblies, a lead-out wire and an annular connecting backplane; a reserved lead-out hole is formed in the annular connecting backplane; one end of the lead-out wire is connected with each coil assembly; the other end of the lead-out wire passes through the reserved lead-out hole of the annular connecting backplane and is connected with an external power supply; the coil assemblies are arranged on the annular connecting backplane; and the annular connecting backplane is connected with the second fixing piece.

2. The ducted double-magnetic-circuit coreless motor special for electric aircraft according to claim 1, wherein the inner rotor structure comprises permanent magnets of inner rotor, an annular load bearing piece of inner rotor, a propeller of inner rotor and a fixed casing; the permanent magnets of inner rotor are arranged on the annular load bearing piece of inner rotor; the propeller of inner rotor is connected with the annular load bearing piece of inner rotor; one end of the propeller of inner rotor facing away from the annular load bearing piece of inner rotor is connected with the fixed casing; the fixed casing is sleeved on the main shaft; and the propeller of inner rotor is rotatable about the main shaft to directly generate the driving force for driving the electric aircraft.

3. The ducted double-magnetic-circuit coreless motor special for electric aircraft according to claim 2, wherein the outer rotor structure comprises permanent magnets of outer rotor, an annular load bearing piece of outer rotor, a propeller of outer rotor and an annular connecting piece; the permanent magnets of outer rotor are arranged on the annular load bearing piece of outer rotor; the propeller of outer rotor is connected with the annular load bearing piece of outer rotor; the annular load bearing piece of outer rotor is connected with one end of the annular connecting piece; the annular load bearing piece of inner rotor is connected with the other end of the annular connecting piece; and the propeller of outer rotor is rotatable about the main shaft to directly generate the driving force for driving the electric aircraft.

4. The ducted double-magnetic-circuit coreless motor special for electric aircraft according to claim 3, wherein the ducted double-magnetic-circuit coreless motor special for electric aircraft further comprises a hemispherical air deflector and a semi-olivary air deflector; the hemispherical air deflector is arranged on the annular connecting piece and the semi-olivary air deflector is arranged on the first bearing sleeve.

* * * * *